Feb. 13, 1962     A. E. TARBOX ET AL     3,021,270
TREATING PLASTIC ARTICLES
Filed Oct. 6, 1958
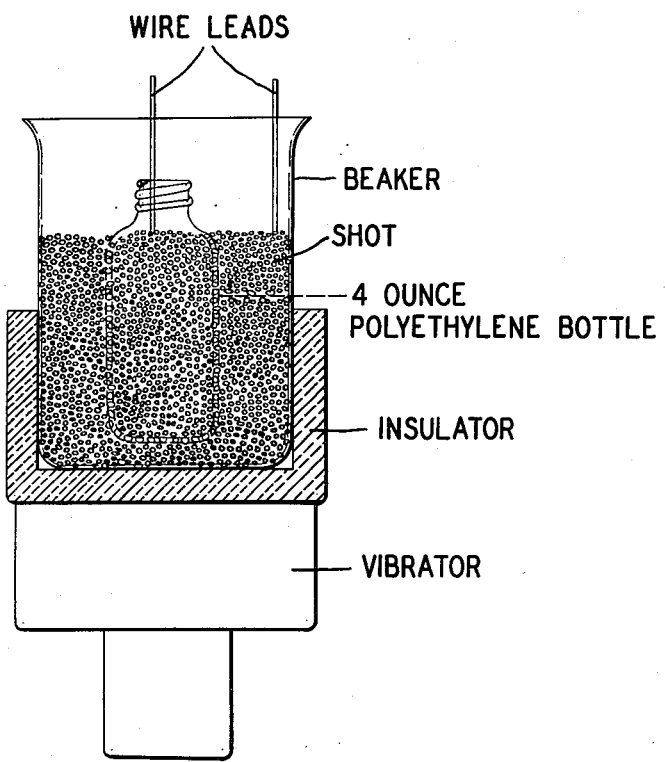
INVENTORS
ALBERT E. TARBOX
BY SHERWOOD LEEDS
ATTORNEY

United States Patent Office 3,021,270
Patented Feb. 13, 1962

3,021,270
TREATING PLASTIC ARTICLES
Albert E. Tarbox, Bridgewater Township, Somerset County, and Sherwood Leeds, Franklin Township, Somerset County, N.J., assignors to Union Carbide Corporation, a corporation of New York
Filed Oct. 6, 1958, Ser. No. 765,290
15 Claims. (Cl. 204—168)

This invention relates to improving the adhesion of plastic articles to inks and coating compositions in general. More particularly, this invention relates to treating surfaces of irregularly shaped or hollow plastic articles such as blown containers, molded bottles and molded or extruded tubing so that when the treated surface is printed or coated and thereafter dried the imprint or coating will adhere securely.

Plastic articles whose surfaces are capable of being satisfactorily printed or coated are highly attractive as packaging means, as such articles can be printed on thereby allowing for advertising and proper identification of the packaged goods. In addition, by proper selection of a coating composition and application thereof to the surface of a "receptive" plastic article, the "impermeability" characteristics of the plastic article, particularly to liquid organic chemicals and liquid cosmetics can be substantially improved.

Plastics such as polyethylene and other plastic material of like nature are extremely difficult to ink or coat because they are, by nature, passive or inert. That is, they do not contain highly "polar" groups which could set up a strong electrostatic union between their surfaces and the atoms of the ink or coating composition. Consequently, adhesion of inks and coating compositions to such plastics depends upon mechanical factors, i.e. the presence of rough or porous areas on the surface of the plastic into which the ink or coating can penetrate to form teeth or anchors. Such adhesion, however, has been found to be unsatisfactory as the adhesion bond between the plastic and ink or coating composition is generally weak. For example, when polyethylene is imprinted with any of the known type of inks, the dried imprints do not adhere firmly. Slight abrasion such as gentle scraping with the back of the fingernail removes the dried imprint very readily.

It has been necessary, therefore, to treat the surfaces of the plastic in order to render such material receptive to inks and coating compositions. Of the various methods proposed, however, none has solved the problem of treating the surfaces of irregularly shaped or hollow plastic articles in order to render such articles receptive, adherent to, and compatible with inks and coating compositions. Irregularly shaped or hollow plastic articles, by virtue of their contour, are extremely difficult to so treat.

One of the methods which has been proposed for the treatment of plastic surfaces involves placing the plastic article on a moving conveyor and rotating or travelling the article through a gas flame. This method, although used with some success for treating the exterior of plastic containers and the like, has found limited use for treating the interior of hollow plastic articles, such as plastic containers, due to the inherent limitations presented by the gas burner and also by the size and shape of the plastic container, particularly its neck opening. Practically insurmountable problems are presented with small hollow shapes of irregular contour with respect to treating the interior thereof. Generally, it is more satisfactory to coat the interior of plastic articles to improve the "impermeability" characteristics of the plastic to organic chemicals and the like. Internal treatment of containers to improve coating adhesion is of obvious importance.

Flame treatment of plastic articles also presents difficult control problems because of the critical nature of the process. It is difficult to control the intensity of the gas flame to prevent deformation of the article being treated. This difficulty becomes greater when treating thin plastic material.

In addition, adjustment and control of the flame to the proper oxidizing nature, which is necessary for treating the plastic material, is difficult under usual operating conditions.

Treating plastic articles with chemicals such as a solution of potassium dichromate in concentrated sulfuric acid has also been found unsatisfactory. The use of chemical reagents is expensive, time consuming and hazardous to personnel. In addition, "chemical" methods require considerable equipment not only for the purpose of treating the plastic article, but also for the purpose of washing the treated article free of the chemical at the conclusion of the operation. If the chemical is not washed completely free from the plastic container, for example, the toxic residue which remains will contaminate the packaged goods.

It is an object of this invention, therefore, to provide for treating both the interior and exterior of both regularly and irregularly shaped plastic articles whereby prior difficulties in treating such articles are eliminated.

It is a specific object of this invention to provide for treating plastic articles whereby the adhesion thereof to inks and coating compositions is substantially improved.

The objects of the present invention are accomplished, in general, by bringing a conforming electrode comprising conducting particles adjacent to the surface of the plastic article which is to be treated, impressing a voltage on the conducting particles whereby a corona discharge is produced which acts on the plastic surface.

The present invention, utilizing a conforming electrode of conducting particles, for the electrical treatment of plastic material, is not limited in its application by the shape of the article which is to be treated. Furthermore, the electrical treatment according to the present invention presents no hazard to either personnel or equipment. In addition, the treatment is economical, does not deform the treated article regardless of thickness and allows for treating both the interior and exterior of the plastic article.

The invention can further be illustrated by reference to the accompanying drawing wherein there is shown a polyethylene bottle, in a glass beaker, filled with and surrounded by conducting particles or "shot" up to shoulder height. The glass beaker rests on and is supported across its entire bottom by an electrical insulator. The entire assembly is mounted on a vibrator which provides for sufficient vibration so that the conducting particles are moved relative to the surfaces of the polyethylene bottle and an air gap is provided between all areas of the surfaces of the polyethylene bottle and the conducting shot at some time during the course of the agitation. A wire lead extends into the conducting shot which is in the polyethylene bottle and a second wire lead extends into the conducting shot which surrounds the polyethylene bottle. If it is desired to subject the interior surface of the polyethylene bottle to a corona discharge, the wire lead extending into the polyethylene bottle is connected to the high voltage lead of a high voltage power source (not shown) as, for example, to the high voltage lead of a Lepel Model (B) High Frequency Spark Generator and the second wire lead connected to the ground lead of the high voltage power source. When it is desired to expose the exterior surface of the polyethylene bottle to a corona discharge, the wire lead connections to the high voltage power source are simply reversed so that the wire lead which extends into the conducting shot surrounding the polyethylene bottle is connected to the high voltage lead of the high voltage power source and the other wire lead is connected to the ground lead of the high voltage power source. With the connections made as desired, the high voltage power source is turned on producing a corona discharge at the appropriate surface, as explained, and the vibrator, which is also in operation, provides sufficient agitation of the conducting shot, allowing the corona discharge to be developed at all points of the appropriate surface of the polyethylene bottle sometime during the course of the agitation so that exposure of the surface to the corona discharge is substantially uniform.

Exposure of a plastic article to a corona discharge in accordance with the present invention does not modify or detract from the desirable properties of the plastic. When the treated plastic article is printed or coated, however, the ink or coating firmly adheres to the surface of the plastic so that very little of the ink or coating can be removed by the standard tests used in the industry which are described below.

TEST FOR INK ADHESION

Test for ink adhesion is conducted by applying cellophane tape, i.e. Texcel 44 supplied by Permacel-Lepages Inc. of New Brunswick, New Jersey, over dried ink imprints which have been previously applied to a plastic article. The cellophane tape is applied over the imprinted article, smoothed on with the fingers and thereafter rapidly stripped off manually. Adhesion qualilites of the plastic are rated as follows, as indicated by a visual examination of the plastic article after the tape has been stripped off.

| Poor | Fair | Good | Excellent |
| --- | --- | --- | --- |
| Almost all of ink removed. | About half of ink removed. | Very little ink removed. | No ink removed. |

TEST FOR COATING ADHESION

Test for cating adhesion is conducted by applying "Scotch" tape (manufactured by Minnesota Mining & Manufacturing Co.) over a dried coating which has been previously applied to a plastic approximately one inch wide. The "Scotch" tape is brought in intimate contact with the dried coating by running a hand roller over the tape once it has been applied. Enough of the "Scotch" tape is used to provide a slight overlap. The overlap is grasped manually and pulled whereby the "Scotch" tape and coating are peeled from the plastic surface for a distance of about ½ inch, the coating adhering to the "Scotch" tape. The two peeled sections, i.e. the plastic film, and the "Scotch" tape and coating are thereafter each secured to the separating jaws of a Suter Tensile Tester. The adhesion in peel is measured by completely peeling the plastic film from the "Scotch" tape, to which is adhered the coating, by moving apart the jaws of the Suter Tensile Tester at a constant rate. The peel strength is noted in grams per inch.

In treating plastic articles such as bottles, containers in general and tubings, the surfaces of the article are disposed between two electrodes at least one of which comprises electrically conducting particles. For example, if the interior of a plastic bottle is to be treated, the bottle is partially or wholly filled with the conducting particles. Alternatively, if the outside of the plastic bottle is to be treated, the exterior surfaces of the plastic bottle are surrounded by a sufficient number of conducting particles. It is to be understood that both electrodes can comprise electrically conducting particles. The possible combination of electrodes which can be used to treat plastic surfaces according to the present invention are noted below in Table I. High voltage capable of producing a corona discharge is impressed upon the electrode adjacent to the side to be treated.

*Table I*

| Side of Plastic To Be Treated | Type of Electrode | | High Voltage Impressed on | Location of Ground (if required) |
| --- | --- | --- | --- | --- |
| | Inside Surface | Outside Surface | | |
| Outside | Conducting particles | Conducting particles | Outside electrode | Inside electrode. |
| Inside | do | do | Inside electrode | Outside electrode. |
| Outside | Electrolyte | do | Outside electrode | Inside electrode. |
| Inside | Conducting particles | Electrolyte | Inside electrode | Outside electrode. |

Irrespective of whether the exterior or interior surfaces of the plastic article are to be treated, the actual number of particles comprising the conforming electrode is such as to insure a thorough exposure, to the corona discharge, of the surface area desired to be treated.

Generally, the conductive particles are agitated relative to the surface being treated in order to insure that all areas of the plastic surface are exposed to the corona discharge. If a solid conducting particle remains in direct contact with the plastic surface, it tends to prevent the development of a corona discharge at the point of contact. Thus, not all areas of the plastic surface will be treated. By agitating the conducting particles, an air gap is provided between all areas of the plastic surface and the conducting particles at some time during the course of the agitation. Consequently, a corona discharge is developed at all points of the plastic surface and exposure of the plastic surface to the corona discharge is substantially uniform.

The need for vibrating solid conducting particles can be eliminated, in some instances, by mixing a porous non-conducting powder, such as wood flour, in with the conducting particles. The powder in effect provides a gap between the plastic surface and the particles thus allowing for development of a corona discharge along all points of the plastic surface.

The exact shape and size of the conducting particles comprising the conforming electrode of the present invention is not critical. For convenience, nearly spherical shaped conducting particles are preferred as they have less tendency to pack and are easier to remove once the article has been treated. Irregularly shaped conducting particles, however, can also be used with good results. Particle size, as previously stated, is not critical. It is preferred to use conducting particles of a size greater than fine dust, however, as so-called "fines" are difficult to remove from the treated article.

The conducting particles can be solid, porous, hollow or can be made up of an electrically non-conducting material coated or plated with a conducting layer. The actual type of conducting particle which is to be used depends upon the plastic material being treated and upon the voltage required to produce a visible corona discharge. Aluminum, copper, steel and lead particles have all proved to be satisfactory and are illustrative of the type of electrically conducting particles which are suitable for purposes of the present invention. Aluminum particles are particularly desirable as they are non-toxic to plastic material and have less tendency toward surface corrosion.

Moreover, aluminum particles on the order of about 20 to 30 mesh are particularly desirable as no agitation of these particles is necessary in order to uniformly treat a plastic surface with a corona discharge.

Suitable electrical connections are made to the electrodes, with one electrode being connected to a high voltage power source capable of producing a visible corona discharge and the other electrode being grounded. The electrical connections or leads to the electrodes, usually wires, can be insulated in order to prevent arcing at points where the leads come close together or they can be bare. The insulation can extend down into the electrodes as long as there is sufficient contact between the electrical leads and electrodes to allow transfer of voltage to the desired electrode. If the electrical leads are bare, they are kept at a sufficient distance apart to prevent arcing.

Exposing a plastic surface to a visible corona discharge generally in the presence of air for a period of time as short as one second modifies the plastic surface rendering it receptive, adherent to and compatible with inks and coating compositions.

Tests indicate the greater the voltage impressed on the electrode, the more effective is the treatment for a given length of time, i.e., the shorter the time required to give a satisfactory degree of treatment. We are unable to explain why plastic material, for example polyethylene, having the property of non-adherence to inks and coating composition is modified by exposure to a corona discharge so that it becomes adherent. The appearance of the plastic material to the naked eye is unchanged but whereas the plastic material was formerly "non-receptive," after exposure to the corona discharge, it becomes highly "receptive" and forms a strong union with inks, coating compositions and the like.

The following examples further illustrate the present invention and are not intended to limit the scope thereof in any manner.

In the examples: "adhesion" was determined by cutting the bottles in half and subjecting the inked or coated surface to the tests previously described; the plastic bottles were made from polyethylene having a density of about 0.92 gram per cc. at 23° C.; bottles not subjected to a corona discharge are referred to as "controls"; ink used to imprint the polyethylene bottles was a red flexograph ink which is an alcoholic reducible, red pigmented, nitrocellulose base ink supplied by the Printing Ink Division of the Interchemical Corporation and designated as I.P.I. NOX 67126 (ink was diluted to a viscosity of between 13 and 15 seconds, as determined by a No. 4 Ford Cup, by an anhydrous ethyl alcohol supplied by the Union Carbide Corporation under the trade name "Synasol"); coating composition used to coat the polyethylene bottles was a 15 percent solution in methylethyl ketone of Saran Resin F–120—a vinylidene chloride-acrylonitrile copolymer manufactured by the Dow Chemical Co. and having the following properties; specific gravity, 25/4° C.; 1.60 refractive index at 25° C., 1,580; tensile strength, lbs./sq. in., 8–10,000; elongation, percent, 8–10; viscosity in centipoise, grade 1000.

EXAMPLE 1

A 4-ounce Boston round polyethylene bottle having a neck opening of about ¾″ and a wall thickness of approximately 40 mils was filled to the bottom of its neck with spherical lead particles, each particle having a diameter of about $\frac{1}{10}$ of an inch. The filled bottle was then placed, open end up, in a glass beaker which rested on and was supported across its entire bottom by an electrical insulator. The insulator was a slab of polyethylene approximately ⅛ inch thick. Spherical lead particles were also poured into the glass beaker so as to completely surround the exterior of the polyethylene bottle up to its neck. A copper wire was inserted into the lead particles inside the polyethylene bottle and a similar wire was inserted into the lead particles inside the glass beaker. The two wires were separated by a space of 2 inches. The wire leading from the lead particles inside the polyethylene bottle was attached to the high voltage lead of a Lepel Model (B) High Frequency Spark Generator. The Lepel generator had a voltage output of approximately 15,000. Its frequency was about 500 kc. per second. The power was varied by a variable power factor capacitor arrangement.

The second wire was attached to the ground lead of this generator which was electrically "grounded" as is well understood by those skilled in the art.

The spark generator was adjusted to its minimum setting of 60 watts input. The interior surface was exposed to a visible corona discharge for 1 second. The shot was then poured out of the bottle. The treated bottle was inked on its interior surface by pouring 25 cc. of red flexographic ink inside the bottle, rotating the bottle manually with its open end down and its longitudinal axis slightly inclined from the vertical until all the excess ink thoroughly drained. The bottle was dried by allowing it to stand overnight at room temperature (about 23° C.).

The outside surface of the bottle was inked by wiping a clean cloth saturated with red flexographic ink over the outside surface. The ink was allowed to dry thoroughly at room temperature.

Ink adhesion of the interior surface which had been exposed to a corona discharge was excellent except that ink was removed from a definite dotted pattern corresponding to the points of contact of the lead shot with the interior surfaces of the polyethylene bottle.

Ink adhesion to the outside surface, i.e. the untreated surface of the bottle, was fair.

A 4-ounce Boston round polyethylene bottle Control "A" was inked on both surfaces by the methods previously described. This bottle was not exposed to any corona discharge. The ink adhesion to both interior and exterior surfaces was poor.

EXAMPLE 2

A 4-ounce Boston round polyethylene bottle was subjected to a corona discharge as described in Example 1 with the exception that the leads were reversed thereby subjecting the exterior surface of the bottle to the corona discharge. The bottle was removed from the glass beaker and inked with a red flexographic ink by wetting a clean, soft cloth with the ink and wiping the ink onto the exterior surface of the bottle. The ink was allowed to dry thoroughly at room temperature.

The interior of the bottle was also inked with red flexographic ink in a manner described in Example 1.

Ink adhesion to the exterior surface was excellent except that ink was removed according to a definite dotted pattern corresponding to points of contact of the lead shot with the exterior surfaces of the polyethylene bottle.

Ink adhesion to the interior surfaces i.e. the untreated surfaces, was fair.

A 4-ounce Boston round polyethylene, bottle Control "B" was inked on both surfaces by the methods previously described. This bottle was not exposed to any corona discharge. The ink adhesion to both interior and exterior surfaces was poor.

In order to eliminate the dotted pattern referred to in Examples 1 and 2, the lead shot was moved during the treating operation. Examples III and IV illustrate the effect of agitating the lead shot to eliminate the "dots."

EXAMPLE 3

A 4-ounce Boston round polyethylene bottle, a glass beaker, and lead particles were assembled in a manner as described in Example 1. The assembly was supported on a slab of polyethylene insulation of about ⅛ of an inch thick and this entire assembly placed on a vertical vibrator having an amplitude of about $\frac{1}{32}$ of an inch. Suitable connections were made to a spark generator for subjecting the interior surface of the polyethylene bottle to a visible corona discharge. The vibrator was activated and the generator turned on for 1 second. At the end of 1 second the treatment was stopped and the lead shot poured from the bottle. The interior of the bottle inked in a manner described in Example I and the ink allowed to dry thoroughly at room temperature.

Ink adhesion was excellent except that ink was removed from small dotted pattern. The vibration decreased the size of the untreated dots but did not altogether eliminate them. The results of this example indicated that the amplitude of vibration was too small and that it was necessary to move the individual particles of lead shot over a distance greater than the area of contact between the particles and the plastic surface. Vibration of lead particles is satisfactory provided that the amplitude of vibration is adequate.

EXAMPLE 4

This example shows the effect of rotating a plastic bottle as it is being exposed to a visible corona discharge.

A 4-ounce Boston round polyethylene bottle was half filled with lead particles, each particle having a diameter of $1/10$ of an inch. The bottle was then placed, open end up, inside an electrically insulated cylindrical container. Lead particles were poured into the cylindrical container whereby the polyethylene bottle was completely surrounded up to shoulder height. This entire assembly was attached to a rotatable shaft wherein the common axis of the bottle and cylindrical container were inclined at about an angle of 20° with respect to the horizontal. The assembly was rotated at one revolution per second as the interior of the bottle was subjected to a visible corona discharge for 5 seconds.

The treated bottle was then inked and dried in a manner described in Example 1. Ink adhesion was excellent up to the level which was in contact with the lead shot inside the bottle during rotation. The rotation eliminated the "dotted" pattern of Examples 1, 2 and 3.

The following Examples 5, 6 and 7 indicate the advantages derived from using aluminum particles as the conducting particles.

EXAMPLE 5

A 4-ounce Boston-round polyethylene bottle was treated as follows: each was filled to the bottom of its neck with aluminum particles having a mesh of from about 20 to 30 (supplied by the Fisher Scientific Co.). Each filled bottle was placed, open end up, in a glass beaker and aluminum particles also poured into the glass beaker so as to completely surround the exterior of the polyethylene bottle up to its neck. Each of the polyethylene bottles was taped in place and suitable electrical connections made to the generator for treating the interior of the bottle by a corona discharge. The entire assembly was then placed on a vibrator as described in Example 3. With the vibrator in motion the generator was turned on for 10 seconds at a setting of 100 watts. The leads to the generator were reversed and the vibrator and generator turned on for 10 seconds. Both interior and exterior surfaces of each bottle were exposed to a corona discharge.

One of the treated bottles was inked on its interior surface with red flexographic ink as described in Example I.

The second treated bottle was inked on the outside with red flexographic ink as described in Example II and coated on the inside with a 15% solution of methyl-ethyl ketone of Saran F-120. The Saran F-120 coating was applied by pouring approximately 50 cc. of the solution into the bottle, then rotating the bottle manually with its open end down and its longitudinal axis inclined slightly from the vertical until the excess coating had drained. The coated bottle was supported at room temperature, open end down, for 1 hour. The bottle was then placed in an air circulation oven at 60° C. for 1½ hours.

Both bottles were allowed to remain at room temperature overnight whereby ink and coating dried thoroughly.

Inked surfaces of both bottles showed excellent adhesion. The coating peel strength of the surface coated with Saran F-120, measured on a Suter Tensile Tester at a loading rate of 6 inches per minute was 220 grams per inch. A similarly coated but untreated polyethylene bottle had a coating peel strength of only 5 grams per inch.

EXAMPLE 6

Example 3 was duplicated with the exception that aluminum particles of about 20–30 mesh were used in lieu of the lead shot.

Ink adhesion was excellent and the "dot" effect was eliminated.

EXAMPLE 7

Example 1 was duplicated with the following exceptions: aluminum particles of about 20 to 30 mesh were used in lieu of the lead shot, the Lepel high frequency spark generator was set for 100 watts input and the interior surface of the bottle was subjected to a visible corona discharge for 30 seconds.

Ink adhesion was excellent. There was no "dot" effect as was the case when lead particles were used.

EXAMPLE 8

The following example indicates that time of exposure is a minor variable with respect to advantageously modifying the surface characteristics of a plastic surface when voltage is constant.

Seven 6-ounce cylindrical polyethylene bottles having a neck opening of about ¾ inch, an average wall thickness of about 30 mils, and a density of 0.92 had their interior surfaces exposed to a corona discharge in a manner described in Example 1 with the following exceptions: aluminum particles of about 20 to 30 mesh were used instead of the lead particles, the spark generator was set for 125 watt input, and the interior surfaces of each bottle treated for periods of time ranging from 2 to 120 seconds.

Each bottle was coated on the inside with Saran F-120 in a manner described in Example 5 with the exception that each coated bottle was oven dried at 60° C. for 1 hour after being coated. Control "C" was coated in a similar manner.

Data obtained by testing the adhesion of the coating is indicated below:

| Treating Time (Time of Exposure to the visible corona discharge) | Adhesion in grams per inch at a loading Rate of 6-Inches per Minute |
| --- | --- |
| 2 | 390 |
| 5 | 435 |
| 10 | 460 |
| 20 | 510 |
| 30 | 310 |
| 60 | 390 |
| 120 | 410 |
| Control "C" | 5 |

EXAMPLE 9

Four 4-ounce Boston round polyethylene bottles of the type previously described were filled to the bottom of their necks with lead particles having a diameter of about $1/10$ of an inch. Each bottle was thereafter immersed to a neck height in an electrolyte described in the table below:

| Bottle | Electrolyte | Approximate Conductivity (mho/cm.×10⁴) | Percent Solids |
| --- | --- | --- | --- |
| I | Aqueous sol. of NaCl | 500 | 4 |
| II | do | 1,000 | 7.5 |
| III | do | 1,500 | 14 |
| IV | do | 2,000 | 21 |

The inside of each bottle was subjected to a corona discharge according to the process described in Example 1 for approximately a 2-second interval.

Each bottle was found to have excellent ink adhesion on the inside treated areas except for dotted effect previously described. Ink adhesion was poor for all bottles on their outside surface.

EXAMPLE 10

The procedure of Example 9 was repeated with the exception that the electrolyte was placed inside each bottle and the particles on the outside. The outside of each bottle was subjected to a corona discharge in a manner described in Example 1 for about 2 seconds. The outside surface of each bottle had excellent ink adhesion except for the previously referred to untreated dots. The inside of each bottle showed poor ink adhesion.

Any electrical source capable of producing a corona discharge can be used to impress a voltage on the conducting particles of the present invention, one such source being the Midget Tesla Coil in addition to source already mentioned.

The improved adhesion obtained by imprinting the surface of polyethylene articles as hereinbefore described is not limited to the use of any specific ink. Articles treated according to the present invention can be printed with various inks such as aniline inks, intaglio inks, drying oil inks, etc., and successfully pass the "Scotch Tape" test. Also, various coatings, adhesives, binding agents and the like can be used to coat plastic articles treated in accordance with the present invention.

The treatment according to the present invention is also applicable to plastics other than polyethylene. Illustrative of such plastics are vinyl chloride copolymers, vinyl-modified butadiene acrylonitrile copolymers, "Saran," rubber hydrochloride, vinyl acetate copolymers and the like.

What is claimed is:

1. Method of treating the surface of a plastic material which comprises bringing a conforming electrode comprising conducting particles adjacent to said plastic surface, providing an air gap between said particles and said plastic surface and impressing a voltage on said particles whereby a corona discharge is produced which acts on said surface of said plastic material.

2. Method as defined in claim 1 wherein the plastic material is polyethylene.

3. Method as defined in claim 1 wherein the conducting particles are of aluminum.

4. Method as defined in claim 1 wherein the conducting particles are of lead.

5. Method of treating the surface of a plastic material which comprises contacting said plastic surface with a conforming electrode comprising conducting particles, impressing a voltage on said particles whereby a corona discharge is produced which acts on said surface of said plastic material, while moving said particles relative to said surface of said plastic material.

6. Method as defined in claim 5 wherein the conducting particles are of lead.

7. Method of treating the surface of a plastic material which comprises contacting said plastic surface with a conforming electrode comprising conducting particles, impressing a voltage on said particles whereby a corona discharge is produced which acts on said surface of said plastic material while moving said particles relative to said surface of said plastic material over a distance greater than the area of contact between said particles and said surface.

8. Method as defined in claim 1 wherein the plastic material is a thermoplastic bottle.

9. Method as defined in claim 1 wherein the conducting particles are in the form of metal shot.

10. Method as defined in claim 5 wherein the conducting particles are of aluminum.

11. Method as defined in claim 5 wherein the conducting particles are in the form of metal shot.

12. Method of treating the surface of a plastic material which comprises bringing a self-conforming electrode comprising a plurality of discrete, conducting particles made of a light-metal into contact with that portion of said surface to be treated and impressing a high voltage on said particles to produce a corona discharge at said surface.

13. Method as defined in claim 12 wherein the conducting particles are of aluminum.

14. Method as defined in claim 13 wherein the conducting particles have a mesh size of 20 to 30.

15. Method as defined in claim 12 wherein the plastic material is a thermoplastic bottle.

References Cited in the file of this patent

UNITED STATES PATENTS

| | | |
|---|---|---|
| 1,440,724 | Soderberg | June 2, 1923 |
| 2,179,261 | Keller | Nov. 7, 1939 |
| 2,471,531 | McIntyre et al. | May 31, 1949 |
| 2,527,294 | Bailey | Oct. 24, 1950 |
| 2,810,933 | Pierce et al. | Oct. 29, 1957 |
| 2,815,449 | Giaimo | Dec. 3, 1957 |
| 2,859,480 | Berthold et al. | Nov. 11, 1958 |
| 2,859,481 | Kaghan et al. | Nov. 11, 1958 |
| 2,879,396 | McDonald | Mar. 24, 1959 |
| 2,923,964 | Plonsky | Feb. 9, 1960 |